(No Model.)

J. GUNDER.
GATE.

No. 431,579. Patented July 8, 1890.

Witnesses
Harry L. Amer.
N. L. Collamer.

By his Attorneys,
C. A. Snow & Co.

Inventor
John Gunder

UNITED STATES PATENT OFFICE.

JOHN GUNDER, OF SIX POINTS, OHIO.

GATE.

SPECIFICATION forming part of Letters Patent No. 431,579, dated July 8, 1890.

Application filed February 24, 1890. Serial No. 341,493. (No model.)

*To all whom it may concern:*

Be it known that I, JOHN GUNDER, a citizen of the United States, residing at Six Points, in the county of Wood and State of Ohio, have invented a new and useful Gate, of which the following is a specification.

This invention relates to gates proper, more particularly of that class which swing in a horizontal plane and are adapted to be raised and lowered when desired.

The object of the present invention is to provide a gate capable of being so raised and lowered in order that it may be set above the ground when it is muddy or covered with snow or ice, or may be raised so high as to permit the passage of pigs, hogs, and sheep, but yet prevent the passage of larger stock when desired, while it is at all times capable of being swung on its hinged edge to open it. This object I accomplish by my improved gate, as hereinafter more fully described, and illustrated in the accompanying drawings, in which—

Figure 1:
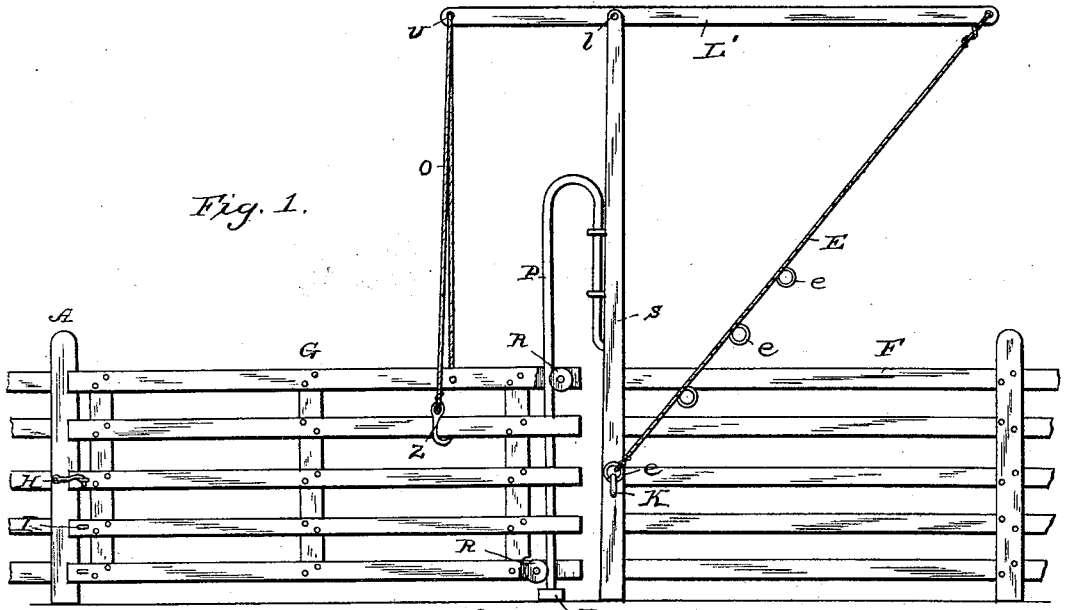
Figure 2:
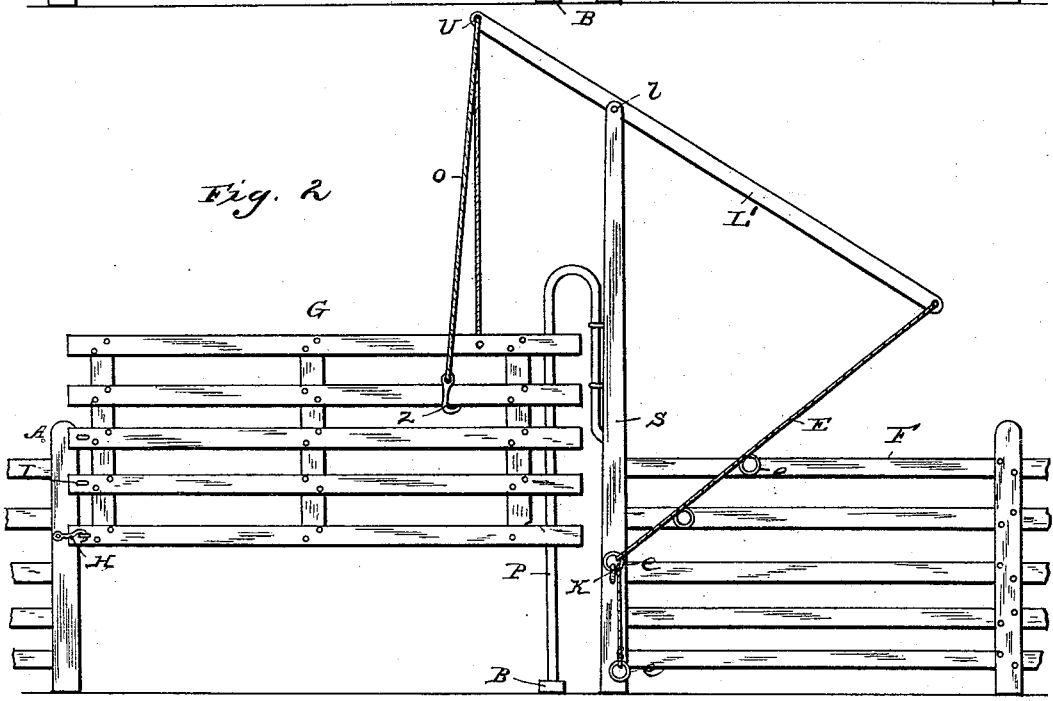

Figure 1 is a side elevation of my improved gate in its normal or lowermost position, and Fig. 2 is a similar view in a raised position.

Referring to the accompanying drawings, letter F designates a fence, and the letter G a gate in the fence.

A is a latch-post at the free end of the gate.

H is a hook pivoted thereto, and I are eyes or loops upon the bars of the gate near its free end, with any one of which the hook H may be engaged, according to the height of the gate.

At its inner end the upper and lower bars of the gate carry grooved rollers or pulleys R, journaled thereto in such a manner that the upper shall stand outside and the lower inside of a vertical pivot-post P, which is preferably a bar of iron seated in a base B in the ground, extending some distance above the gate, turned outwardly and downwardly, and secured to a supporting-post S, which preferably constitutes one of the uprights of the fence F at that side of the gate. The gate is connected by its rollers R to this pivot-post in such a manner that its weight is to a considerable extent sustained thereby, that it can turn around said post in a horizontal plane, and that it can be raised and lowered upon said post, all as will be clearly understood.

The said supporting-post S also supports a lever L', centrally pivoted, as at $l$, to the upper end of the post, and having a hole U in its forward end, which projects over the gate. A supporting-cord O is connected to the upper bar of the gate near its roller R, led thence through the hole U in the forward end of the lever, and downwardly to a hook Z, which may be engaged with any desired bar of the gate. An elevating-cord E is connected to the inner end of the lever L, and is provided with a number of rings or loops $e$ in its body, adapted to engage a hook K in the post S. In its normal position, as shown in Fig. 1, the end ring $e$ of the cord E is engaged with the hook K, and the gate G swings close to the ground the same as any other gate, the hook H engaging the uppermost of the eyes I. If now it is desired to have the gate swing a little above the ground, so as to leave an opening below it, the cord E is drawn upon, the lever L turned about its pivot $l$, its inner end elevated, and the cord O consequently caused to exert a lifting force upon the gate. The latter may thus be drawn to any desired height and there secured by engaging the proper ring $e$ on the hook K, as shown in Fig. 2 of the drawings.

It will be noticed that the forward end of the lever L stands approximately above the point where the cord O is attached to the gate, and when the latter opens this point of attachment is carried laterally away from a point below the end U, so that the entire gate is slightly lifted in the act of opening it, and will automatically close when it is released. This action takes place whether the gate is in raised or lowered position. It will also be observed that the hook H engages one of the eyes I whatever the height of the gate above the ground.

What I claim is—

1. The stationary supporting-post S, the lever L, pivoted at $l$ to the upper end of said post, and an operating-cord E, connected to the rear end of the lever and depending therefrom, in combination with a gate G, hinged so as to swing in a horizontal plane at a variable height, and a supporting-cord O, adjustably connected at one end to a bar of the gate, led thence through a hole U in the front end of the lever, and connected at its other end to a fixed part of the gate, substantially as described.

2. The supporting-post S, having the hook K, the lever L, pivoted between its ends to the upper end of said post, an operating-cord E, connected to the rear end of said lever, and having rings e adapted to engage said hook, and the pivot-post P, parallel with and in front of said supporting-post, in combination with a gate G, having rollers R at its inner end engaging said pivot-post, and a supporting-cord O, adjustably connected at one end to the gate, its body passing through a hole U in the inner end of the lever, and its other end secured to the gate, the whole constructed and adapted to operate substantially as and for the purpose set forth.

In testimony that I claim the foregoing as my own I have hereto affixed my signature in presence of two witnesses.

JOHN GUNDER.

Witnesses:
 WILLIAM RUBEL,
 JOHN C. FRIEND.